United States Patent
Johnson et al.

(10) Patent No.: US 12,520,818 B2
(45) Date of Patent: Jan. 13, 2026

(54) APPARATUS AND SYSTEM FOR INTERACTING WITH AN ANIMAL

(71) Applicant: Interplay, LLC, Kansas City, MO (US)

(72) Inventors: Jonaie Johnson, Kansas City, MO (US); Blake Hodgson, Mission, KS (US)

(73) Assignee: INTERPLAY, LLC, Kansas City, MO (US)

(*) Notice: Subject to any disclaimer, the term of this patent is extended or adjusted under 35 U.S.C. 154(b) by 0 days.

(21) Appl. No.: 17/838,037

(22) Filed: Jun. 10, 2022

(65) Prior Publication Data

US 2022/0394953 A1 Dec. 15, 2022

Related U.S. Application Data

(60) Provisional application No. 63/351,192, filed on Jun. 10, 2022, provisional application No. 63/202,456, filed on Jun. 11, 2021.

(51) Int. Cl.
*A01K 5/02* (2006.01)
(52) U.S. Cl.
CPC .................. *A01K 5/0216* (2013.01)
(58) Field of Classification Search
CPC .................................... A01K 5/0216
See application file for complete search history.

(56) References Cited

U.S. PATENT DOCUMENTS

| | | | | |
|---|---|---|---|---|
| 6,062,166 | A * | 5/2000 | Macrina | A01K 7/02 119/51.11 |
| 7,392,763 | B2 * | 7/2008 | Willinger | A01K 39/012 119/475 |
| 8,544,418 | B2 | 10/2013 | Jiang et al. | |
| 9,277,729 | B1 | 3/2016 | Wright | |
| 10,208,975 | B2 | 2/2019 | Azevedo et al. | |
| 2001/0020449 | A1 * | 9/2001 | Louden | A01K 1/0356 119/51.01 |
| 2003/0106497 | A1 * | 6/2003 | Heinzeroth | A01K 5/025 119/61.3 |
| 2005/0224003 | A1 * | 10/2005 | Yin | A01K 5/0275 119/61.5 |
| 2008/0282988 | A1 * | 11/2008 | Bloksberg | A01K 15/021 119/51.02 |

(Continued)

FOREIGN PATENT DOCUMENTS

GB 2512674 A * 10/2014 ........... A01K 15/021

*Primary Examiner* — Monica L Perry
*Assistant Examiner* — Brittany A Lowery
(74) *Attorney, Agent, or Firm* — Husch Blackwell LLP (57) ABSTRACT

An apparatus for remotely feeding and remotely engaging with an animal is provided herein. The apparatus comprises a body including a food container and a water reservoir for storing food and water to be provided to a domestic animal. The apparatus further includes a dispenser system that is in communication with the food container and the water reservoir. The dispenser system is remotely controllable by the user such that the user may provide sustenance to the animal even when remote from the animal. The apparatus also includes at least one sensor that allows the user to remotely interact with and engage with the animal. The user may control the remotely controllable features of the apparatus via a device, such as a smart phone.

20 Claims, 6 Drawing Sheets

(56) References Cited

U.S. PATENT DOCUMENTS

| | | | |
|---|---|---|---|
| 2013/0300863 A1* | 11/2013 | Tait | A01K 15/021 |
| | | | 348/143 |
| 2014/0083364 A1* | 3/2014 | Anderson | A01K 15/02 |
| | | | 119/51.01 |
| 2014/0149546 A1* | 5/2014 | Hong | A01K 29/005 |
| | | | 709/217 |
| 2015/0181801 A1* | 7/2015 | Niemela | A01C 17/001 |
| | | | 119/51.01 |
| 2017/0196196 A1* | 7/2017 | Trottier | A01K 29/005 |
| 2019/0029221 A1* | 1/2019 | Anderton | A01K 5/0225 |
| 2020/0037577 A1* | 2/2020 | Dzamba | A01K 5/025 |
| 2020/0093092 A1* | 3/2020 | Soug | B25J 5/007 |

* cited by examiner

APPARATUS AND SYSTEM FOR INTERACTING WITH AN ANIMAL

CROSS-REFERENCE TO RELATED APPLICATIONS

This Application claims priority to U.S. Provisional Patent Application Ser. No. 63/202,456, filed on Jun. 11, 2021, entitled "AN APPARATUS AND SYSTEM FOR REMOTELY FEEDING AND ENGAGING WITH AN ANIMAL,", and U.S. Provisional Patent Application Ser. No. 63/351,192, filed on Jun. 10, 2022, entitled "AN APPARATUS AND SYSTEM FOR REMOTELY FEEDING AND ENGAGING WITH AN ANIMAL, the entire disclosures of which are incorporated herein by reference.

FIELD OF INVENTION

The present invention relates generally to devices for animals and, more particularly, to an apparatus for remotely feeding and engaging with an animal through remotely controllable features for monitoring, engaging with, and providing sustenance to an animal.

BACKGROUND OF INVENTION

Domestic pet ownership is generally on the rise globally, and in the United States more particularly. Owners of such domestic pets rely on various means for enclosing, or crating, their domestic pets. Some pet owners crate their domestic pets when they are away from their residence, especially in residences such as small apartments or small townhomes. In addition, a pet owner can crate their domestic pets at their residence for other purposes, including, without limitation, for safety, training, obedience, anxiety treatment, and the like. In other circumstances, a pet owner may choose to crate their domestic pets at a location other than their residence, including, without limitation, a veterinarian's office, a pet care facility, a daycare-like facility, an overnight boarding facility, outside of stores, restaurants, and other establishments that do not generally permit the entry of domestic pets, and the like. This form of crating or enclosing of domestic pets generally requires the physical separation of the pet owner from the domestic pet, such that it is more difficult for the pet owner to monitor, selectively enclose, engage with, or provide sustenance to the domestic animal.

The reasons for needing to crate a domestic pet are myriad. In an era of increasing emphasis on experiences and experiential activities, an owner of a domestic pet may find her interest in pursuing various experiences to be at odds with, or even conflicting with, her responsibilities as a pet owner. This can be especially true for long-distance traveling or participating in activities at locations that do not generally permit the entry of domestic pets. For these reasons, it may be desirable to crate a domestic pet, or find another way to ensure that the well-being of the domestic pet is properly managed. Crating a domestic pet is advantageous to other, alternative forms of managing a domestic pet's well-being, such as boarding the pet or hiring a pet-sitter, which are often costly and require logistical planning and coordination.

When crating a domestic animal or leaving the domestic animal alone, it can be desirable for a pet owner to be able to monitor, engage with, or provide sustenance to their domestic animal. Known apparatuses and systems for crating an animal have their drawbacks and do not provide means to adequately monitor, engage with, or provide sustenance to the domestic animals. Generally, common animal enclosures do not contain electronic features, or components. Most animal enclosures that contain electronic components do not provide means for adequately controlling those electronic components, either individually or together, remotely. Further, most animal enclosures that contain electronic components do not have the ability to be adequately controlled remotely by a user via a device, such as a cell phone, tablet, or the like.

Further, since some animals may be prone to separation anxiety, it can be desirable for a pet owner to engage with or otherwise communicate with their domestic animal in an animal enclosure. Specifically, for some domestic animals, spending more than four hours alone can negatively affect the animal's happiness, behavior, and quality of life, especially for dogs. According to some estimates, there are fifty-five million dogs in the United States that suffer from separation anxiety. Known devices and methods for treating or assuaging separation anxiety in domestic animals are not without their shortcomings. Specifically, independence training, drug therapy, exercise, food puzzles, and the like can be costly and inadequate in addressing the source of the separation anxiety in the domestic animal.

Thus, a need exists for an apparatus with features for managing the well-being of a domestic animal—namely, remotely controllable features for monitoring, engaging with, and providing sustenance to an animal. A need also exists for a system that allows for a user to remotely control features of an apparatus for monitoring, engaging with, and providing sustenance to an animal.

BRIEF SUMMARY OF THE INVENTION

The present invention overcomes many of the shortcomings and limitations of the prior art devices discussed above. The invention includes several embodiments of an apparatus for remotely feeding and remotely engaging with an animal. The apparatus may comprise a body including a food container and a water reservoir for storing food and water, respectively. A dispenser system in communication with the food container and/or the water reservoir may be remotely controllable by a user such that sustenance can be provided to the animal even if the user is remote from the apparatus. The apparatus may also include a controller that can, by way of non-limiting example, supply sustenance to the animal at certain times of the day, when the animal has engaged in a certain level of activity, and/or when the animal approaches the apparatus.

In an embodiment, the apparatus may include an at least one sensor adapted to allow the user to remotely interact with and engage with the animal. More particularly, the at least one sensor may comprise a means for visually and/or audially monitoring and engaging with the animal. In some embodiments, the at least one sensor may comprise a camera, a speaker, a two-way microphone, a proximity sensor, and the like.

In another embodiment, the user may control or activate the remotely controllable features of the apparatus via a device, such as a smart phone. The remotely controllable features and the device may be in wireless communication through, by way of non-limiting example, a Bluetooth network and/or a Wi-Fi network.

In yet a further embodiment, the apparatus may be couplable to an external member that can enhance the functionality of the apparatus. Such external member may be provided as an enclosure or as a stand. When coupled to the enclosure, the apparatus may provide sustenance to the animal within the enclosure and/or provide a means for the user to interact with the animal in the enclosure.

These and other aspects and advantages of the present invention will become apparent to those skilled in the art after considering the following detailed description in connection with the accompanying drawings

BRIEF DESCRIPTION OF THE SEVERAL VIEWS OF THE FIGURES AND DRAWINGS

In the accompanying drawings, which form a part of the specification and are to be read in conjunction therewith in which like reference numerals are used to indicate like or similar parts in the various views.

DETAILED DESCRIPTION OF THE INVENTION

Various embodiments of the present invention are described and shown in the accompanying figures and drawings. For purposes of clarity in illustrating the characteristics of the present invention, proportional relationships of the elements have not necessarily been maintained in the figures and drawings. It will be understood that any dimensions included in the figures and drawings are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One objective of the present invention is to provide an apparatus with features for managing the well-being of a domestic animal—namely, remotely controllable features for monitoring, engaging with, and providing sustenance to an animal. Another objective of the present invention is to provide a system that allows for a user to remotely control features of an apparatus for monitoring, engaging with, and providing sustenance to an animal, including from a cell phone or tablet.

Figure 1:
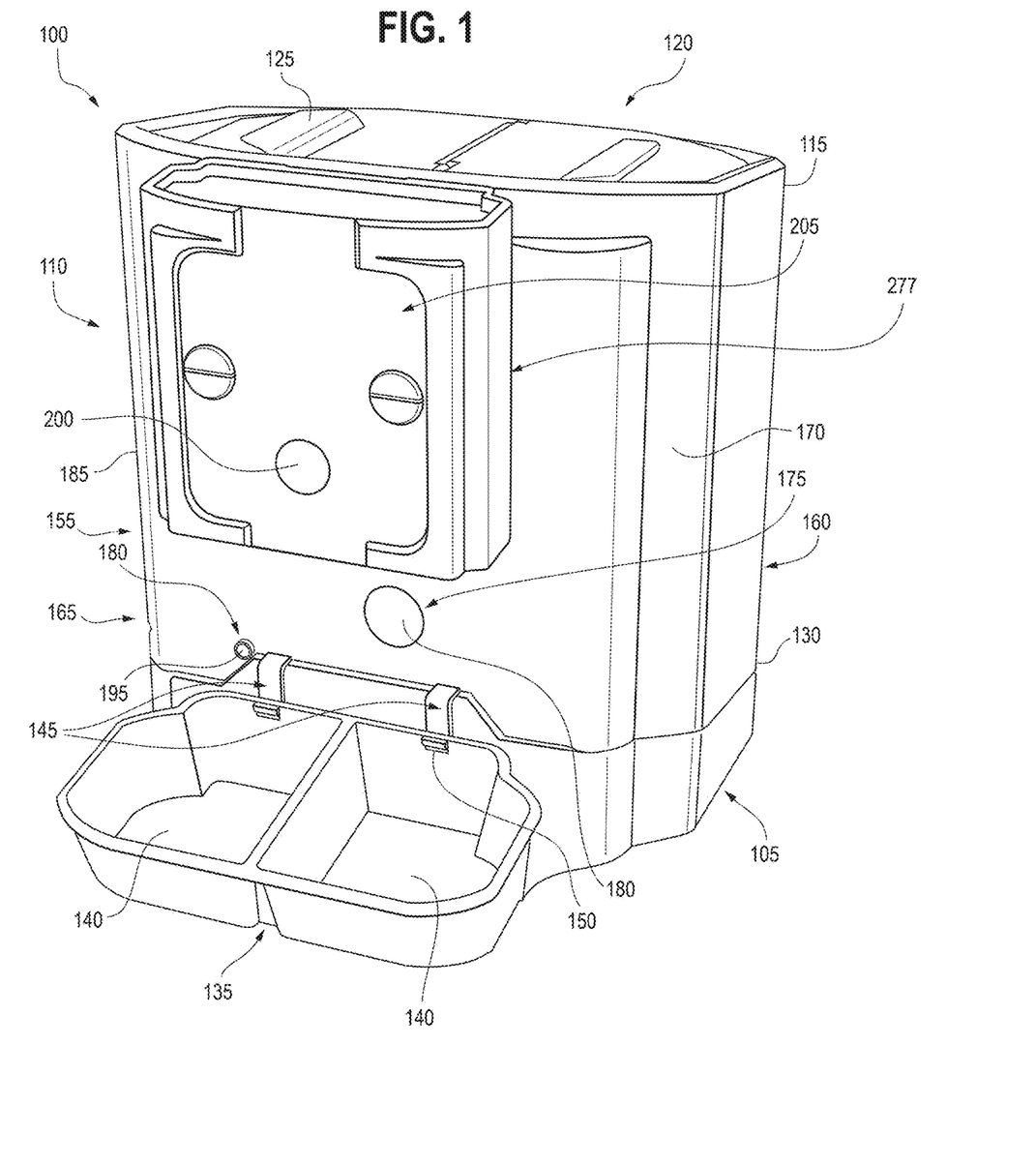
FIG. 1 is an isometric view of a modular apparatus according to the teachings of an embodiment of the present invention.

As illustrated in FIG. 1, an embodiment of the present invention is designed to provide a modular apparatus 100 with features for managing the well-being of a domestic animal or a pet that generally comprises a variety of features, wherein such features are generally controllable by the user remotely or from a location other than the location of the modular apparatus 100. It will be understood that the remoteness or distance between the location of the user and the location of the modular apparatus 100 can vary widely and will extend as far as the various communication means of the modular apparatus 100, whether presently known or later developed, will permit. The variety of features may include, without limitation, means for monitoring, selectively enclosing, engaging with, or providing sustenance to a domestic animal. In one embodiment, the modular apparatus 100 can generally comprise a microprocessor, water sensor, water pump, sonar sensor, servomotor(s), a battery, a speaker, and an MP3 device.

In an embodiment, the modular apparatus 100 may be coupled to an external member.

The external member may provide the modular apparatus 100 with stability when the modular apparatus 100 rests upon a surface and/or additional functionality. In further embodiments, the external member may comprise a stand 105 or a representative enclosure 300 (illustrated in FIGS. 4 and 5). Thus, because the modular apparatus 100 may couple to either the stand 105, the representative enclosure 300, or yet another external member, the modular apparatus 100 may interact with a pet when the pet is housed in an enclosure or when the pet is free to move about a room in which the modular apparatus 100 is placed.

A body 110 of the modular apparatus 100 may be provided in a variety of shapes and forms including, but not limited to, a rectangular prism, an elongated cylinder, or other three-dimensional shapes. The body 110 may have a top portion 115 including a lid 120 that may be selectively opened and closed by the user. The lid 120 may be connected to top portion 115 via a hinge connection or otherwise selectively removable from top portion 115 and body 110 to enable access to the interior of the modular apparatus 100 as described in greater detail herein. When the lid 120 is in an open position, the user may fill the modular apparatus 100 with items that can provide the pet sustenance (e.g., food and water). When the lid 120 is in the closed position, the lid 120 may help protect the items contained within the modular apparatus 100 from environmental conditions (such as moisture, insects, and the like) and help prevent the items from spilling if the modular apparatus 100 is tipped over. The lid 120 may also include handles 125 that provide the user with a convenient location to grip the lid 120 when opening and/or closing the lid 120.

The body 110 may also include a bottom portion 130. When the modular apparatus 100 is coupled to the stand 105, the bottom portion 130 may abut the stand 105. The bottom portion may comprise a substantially flat surface such that the modular apparatus 100 can more securely sit on the stand 105, although other shapes for the bottom portion 130 are foreseeable. The bottom portion 130 may be substantially or entirely enclosed to help prevent the items stored within the modular apparatus 100 from spilling or leaking out of the modular apparatus 100.

A tray 135 may be coupled to the bottom portion 130. The tray 135 may be configured to retain food, water, and/or other items dispensed by the modular apparatus 100. More specifically, the tray 135 may be provided as a three-dimensional object (e.g., a rectangular prism) with openings for placing items therein. In an embodiment, the tray 135 may include two compartments 140 for retaining food and water, although the tray 135 may have one compartment or may include additional compartments in alternative embodiments. Further, in yet other embodiments of the invention, the tray 135 may be coupled to the top portion 115 or elsewhere on the body 110 as would be appreciated by those skilled in the art.

The tray 135 may be coupled to the modular apparatus 100 via an attachment means 145. In the illustrated embodiment, the attachment means 145 is provided as j-hooks that are received through apertures 150 in the tray 135. In alternative embodiments of the invention, the tray 135 may be coupled to the modular apparatus 100 in other manners including, by way of non-limiting example, screws, clamps, clasps, Velcro, and the like. The tray 135 may be removably coupled to the modular apparatus 100 by the attachment means 145 so that the tray 135 can be selectively removed by a user for cleaning or other purposes and then re-attached or connected to the modular apparatus 100.

In an embodiment, the tray 135 may be positioned and located adjacent to a dispenser system 155 that provides sustenance to the domestic animal. More specifically, the tray 135 may be positioned below the dispenser system 155, although other positions for the tray 135 are foreseeable. The dispenser system 155 may be adapted to dispense food, water, and/or other items stored within the modular apparatus 100 to the tray 135. Advantageously, as will be explained in more detail below, the dispenser system 155 may be triggered remotely by a user. This may allow the user to provide their animal with sustenance even when the user is physically remote from the modular apparatus 100 and/or their pet.

In an embodiment, the dispenser system 155 may comprise a means for providing sustenance to a domestic animal, including a food dispenser, a water dispenser, and/or a combination food and water dispenser system. In another embodiment, the dispenser system 155 may comprise a food dispenser system 160 and a water dispenser system 165. The food dispenser system 160 may generally comprise a food container 170 for storing food and a food dispenser 175 configured to dispense or provide the food to the domestic animal by various mechanical means, including via a lever, through a rotating wheel, or the like. In addition, the food dispenser system 160 may include an aperture 180 that can be opened and closed by the food dispenser system 160. When the aperture 180 is opened, food may exit the food container 170 (via the action of gravity, a lever, a rotating wheel, and the like) and fall into the tray 135 positioned below the aperture 180. The water dispenser system 165 may generally comprise a water tank or a water reservoir 185 for storing water and a water dispenser 190 for dispensing or providing the water to the domestic animal by various means including, but not limited to, via gravity, a fluid pump, or the like. Similar to the food dispenser system 160, the water dispenser system 165 may include a selectively openable channel or aperture 195 via which water can be provided to the tray 135.

In an embodiment, the food container 170 and the water reservoir 185 may comprise the body 110 of the modular apparatus 100 such that each of the food container 170 and the water reservoir 185 are integrally formed compartments within the interior of the body 110. In certain embodiments, the food container 170 and the water reservoir 185 can be configured as separate structural compartments that are inserted into (or coupled to) the body 110 of the modular apparatus 100. The food container 170 and water reservoir 185 can also be selectively removable from the body 110 in such embodiments. It is also recognized that the modular apparatus 100 can include alternative or additional compartments or storage means beyond food container 170 and water reservoir 185 in select embodiments (not shown). In further embodiments of the invention, the food dispenser 175 and the water dispenser 190 may be positioned and located within the body 110 or coupled to an outside surface of the body 110. In yet further embodiments, the food dispenser 175 may be at least partially disposed within the food container 170 and the water dispenser 190 may be at least partially disposed within the water reservoir 185. In alternative embodiments of the invention, the food dispenser system 160 and the water dispenser system 165 may be coupled to the body 110 or another portion of the modular apparatus 100 as would be appreciated by those skilled in the art.

In an embodiment (such as the embodiment illustrated in FIGS. 4 and 5) at least a portion of the food dispenser system 160, the water dispenser system 165, or the dispenser system 155, may be located inside an enclosure (e.g., a crate or a kennel) and may further comprise an at least one sensor 200. In such an embodiment, the dispenser system 155 may include the at least one sensor 200 incorporating any of the features described below for monitoring, feeding, watering, and engaging with the domestic animal.

The means for monitoring a domestic animal may comprise the least one sensor 200 positioned and located on the body 110 or an attachment apparatus 205 of the modular apparatus 100. The at least one sensor 200 may be, e.g., a camera and related audio-visual equipment. The sensor 200 can be capable of rendering an output signal or deliverable data capable of being used or processed by a user. Further, the sensor 200 can be at least one of or any combination of the following: proximity sensors, non-physical contact sensors, acoustic sensors, infrared sensors, RADAR sensors, sonar sensors, light detection and ranging ("LIDAR") sensors, ultrasonic sensors, digital cameras or other optical instruments, structured light or stereo camera vision sensors, combinations of the foregoing, or any other suitable presently known or future developed sensing means. The sensor 200 can have low-light capabilities, such as night vision capabilities, such that it would be possible to view objects in extremely low light or even in the dark.

Further yet, the sensor 200 may provide a means for engaging with and monitoring the domestic animal. For example, the sensor 200 may comprise a microphone and/or a speaker, including a combination microphone and a speaker, and related audio-visual equipment, including, without limitation, an MP3 device. The combination microphone and speaker may be capable of permitting two-way communication between a user and a domestic animal, and further being capable of permitting a user to selectively play music for a domestic animal through the MP3 device.

In another embodiment, the sensor 200 may be capable of monitoring various aspects of the modular apparatus 100 or the behavior of the domestic animal, including, without limitation, the presence or proximity of a domestic animal, the movement of the domestic animal, the location of the domestic animal in the environment surrounding the modular apparatus 100, and the like. The sensor 200 can be at least one of or any combination of the following: proximity sensors, impact sensors, strain gauges, accelerometers, non-physical contact sensors, acoustic sensors, infrared sensors, RADAR sensors, sonar sensors, LIDAR sensors, ultrasonic sensors, digital cameras or other optical instruments, structured light or stereo camera vision sensors, speed sensors, capacitive moisture sensors, mass flow sensors, yield sensors, global positioning system ("GPS") sensors, combinations of the foregoing, or any other suitable presently known or future developed sensing means. Further, the sensor 200 can be capable of rendering an output signal or deliverable data capable of being used or processed by a user, such as a notification of the domestic animal's presence, movement, and/or location relative to the modular apparatus 100.

In yet another embodiment, the at least one sensor 200 may be capable of monitoring various aspects of the modular apparatus 100 relative to the provision of sustenance to the domestic animal, including, without limitation, tracking the amount of food and/or water dispersed to the animal, the flow rate of food and/or water, the amount of food and/or water remaining in a receptacle designated for the animal, the amount of food remaining in the food container 170, the amount of water remaining in the water reservoir 185, and the like. The at least one sensor 200 can be at least one of or any combination of the following: proximity sensors, impact sensors, strain gauges, accelerometers, non-physical contact sensors, acoustic sensors, infrared sensors, RADAR sensors, sonar sensors, LIDAR sensors, ultrasonic sensors, digital cameras or other optical instruments, structured light or stereo camera vision sensors, speed sensors, capacitive moisture sensors, mass flow sensors, yield sensors, combinations of the foregoing, or any other suitable presently known or future developed sensing means. In one embodiment, the food dispenser system 160 may comprise a sonar sensor for measuring the food levels, including, without limitation, the food level in the food container 170 and/or the food level in a bowl or similar container for serving food to the domestic animal. In another embodiment, the water dispenser system 165 may comprise a water sensor, including, without limitation, a water sensor to measure the water level in the water reservoir 185, the flow rate of water dispensed by the water dispenser, and/or the water level in a bowl or similar container for serving water to the domestic animal.

In one embodiment, the dispenser system 155 can be programmed to selectively provide sustenance to the domestic animal at various times or under various conditions. For example, the dispenser system 155 can be programmed to selectively provide food and/or water to the domestic animal when it is detected that the domestic animal is inside an enclosure or when the domestic animal is within a certain proximity to the modular apparatus 100. Alternatively, the dispenser system 155 can be programmed to provide food and/or water to the domestic animal at certain times of the day based on the animal's food consumption, water consumption, physical activity, and the like. In another embodiment, the dispenser system 155 can be adapted to selectively provide food and/or water to the domestic animal, either by a user or by the domestic animal. For example, a user can remotely and selectively provide food and/or water, including, without limitation, a treat, to the domestic animal. Or, the domestic animal can trigger a sensor that selectively provides food and/or water, including, without limitation, a treat, to the domestic animal. Further, the dispenser system 155 can be capable of rendering an output signal or deliverable data capable of being used or processed by a user. For example, the output signal can comprise a notification that food and/or water has been provided to the domestic animal, whether automatically via programming or selectively via the user and/or the domestic animal. Further, the output signal could comprise a notification when the food stored in the food container 170 and/or the water stored in the water reservoir 185 is running low or has run out. Or, the deliverable data can comprise, based on the data collected by the at least one sensor 200, information regarding the animal's food consumption and/or water consumption, including, without limitation, the amount consumed, the time food and/or water was consumed, and the like. Such information may be desirable to the user for purposes of tracking the domestic animal's vital signs, and may be collected or delivered to a veterinarian or other pet healthcare professional for purposes of examining, studying, or making a diagnosis or health-related decision based off of such data. Further, the deliverable data can comprise, based on the data collected by the at least one sensor, information regarding the amount of food remaining in the food hopper and/or the amount of water remaining in the water tank.

Figure 2:
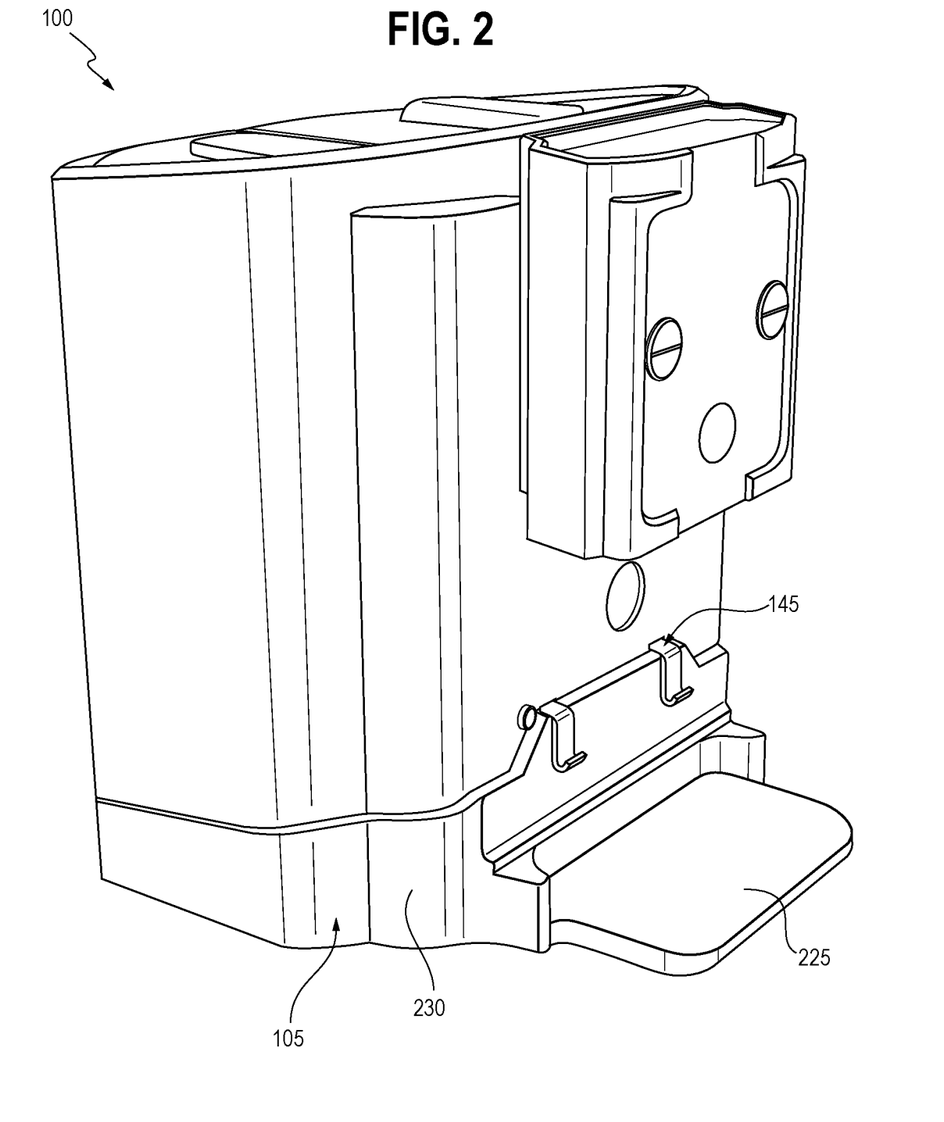
FIG. 2 is an isometric view of the modular apparatus of FIG. 1, with a tray of the modular apparatus removed.

Turning to FIG. 2, the stand 105 that may be selectively coupled to the modular apparatus 100 is further illustrated. The stand 105 may comprise a lip 225 that extends outwardly and away from a stand body 230. The lip 225 may be positioned and located below the attachment means 145, although other positions for the lip 225 are foreseeable. The lip 225 may provide a surface upon which the tray 135 may sit, helping ensure that the tray 135 does not tip over as the domestic animal eats or drinks therefrom.

Figure 3:
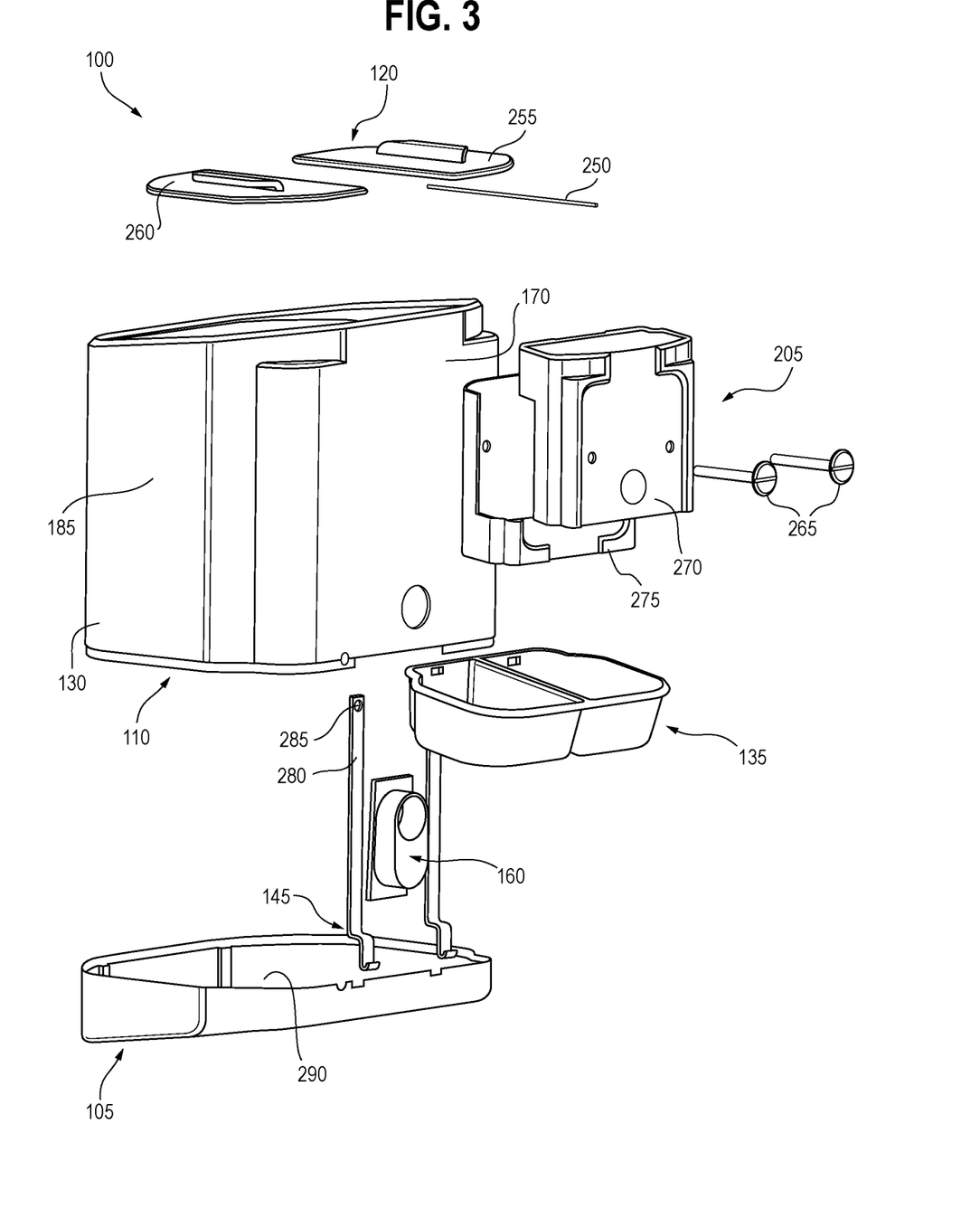
FIG. 3 is an exploded view of the modular apparatus of FIG. 1.

As illustrated in FIG. 3, a rotatable attachment mechanism, such as a hinge 250, may be provided between a first portion 255 and a second portion 260 of the lid 120. The hinge 250 may allow for the portions 255, 260 to rotate away from the body 110 of the modular apparatus 100 such that the user can access an interior of the body 110 of the modular apparatus 100. Further, each portion 255, 260 may be configured to open separately from one another, thereby allowing the user to access the food container 170 and the water reservoir 185 separately. In alternative embodiments of the invention, both portions 255, 260 may be configured to open and close at the same time. In yet further embodiments, the lid 120 may be provided as one piece such that both the food container 170 and the water reservoir 185 are accessible at the same time when the lid 120 is opened. In yet other embodiments of the invention, the hinge 250 (or another suitable attachment mechanism) may be positioned and located elsewhere on the lid 120. The lid 120 can be secured the body 110 so that only the first portion 255 and second portion 260 may be rotated about hinge 250 to allow access to the interior of the modular apparatus 100 in certain embodiments. Additionally, the lid 120 can be selectively removably from the body 110 and then re-attached or repositioned thereon. The lid 120 can also be configured to be secured to the body 110 by any suitable locking mechanism or attachment means, such as but not limited to a latch, lock, clip or other component to secure the lid 120 to the body 110 in particular embodiments of the invention.

The attachment apparatus 205 may be affixed to or coupled to the body 110 of the modular apparatus 100. The attachment apparatus 205 may assist the user in attaching the modular apparatus 100 to an enclosure that houses the domestic animal including, by way of non-limiting example, a kennel or a crate. In the illustrated embodiment, the attachment apparatus 205 comprises screws or fastening means 265, a body portion 270, and a plate 275, although in other embodiments the attachment apparatus 205 may comprise other and/or alternative components. In some instances, the body portion 270 and the plate 275 may constitute a housing 277 of the attachment apparatus 205 (see FIG. 1). The fastening means 265 may be configured as screws, bolts, pins, rods, or another suitable attachment means, and may couple the attachment apparatus 205 to the body 110. In particular, when the fastening means 265 are first received into the body 110 of the modular apparatus 100, the attachment apparatus 205 may be coupled to the modular apparatus 100. In alternative embodiments of the invention, the attachment apparatus 205 may be coupled to the body 110 in other manners as would be appreciated by those skilled in the art.

In an embodiment, the attachment means 145 may also be coupled to the body 110 via the fastening means 265. In such an embodiment, the attachment means 145 may be provided as a j-hook with an elongated portion 280 that extends upwardly and into the body 110 of the modular apparatus 100. The elongated portion 280 may further include apertures 285 for receiving the fastening means 265 (or another suitable attachment means) therein.

In an embodiment, the shape of the stand 105 may substantially mirror the shape of the bottom portion 130 of the modular apparatus 100. The stand 105 may include an opening 290 that is the same size as, or larger than, the bottom portion 130 such that the bottom portion 130 may be received within the stand 105. In alternative embodiments, the stand 105 may be provided without an opening such that the bottom portion 130 rests on a top surface of the stand 105.

Figure 4:
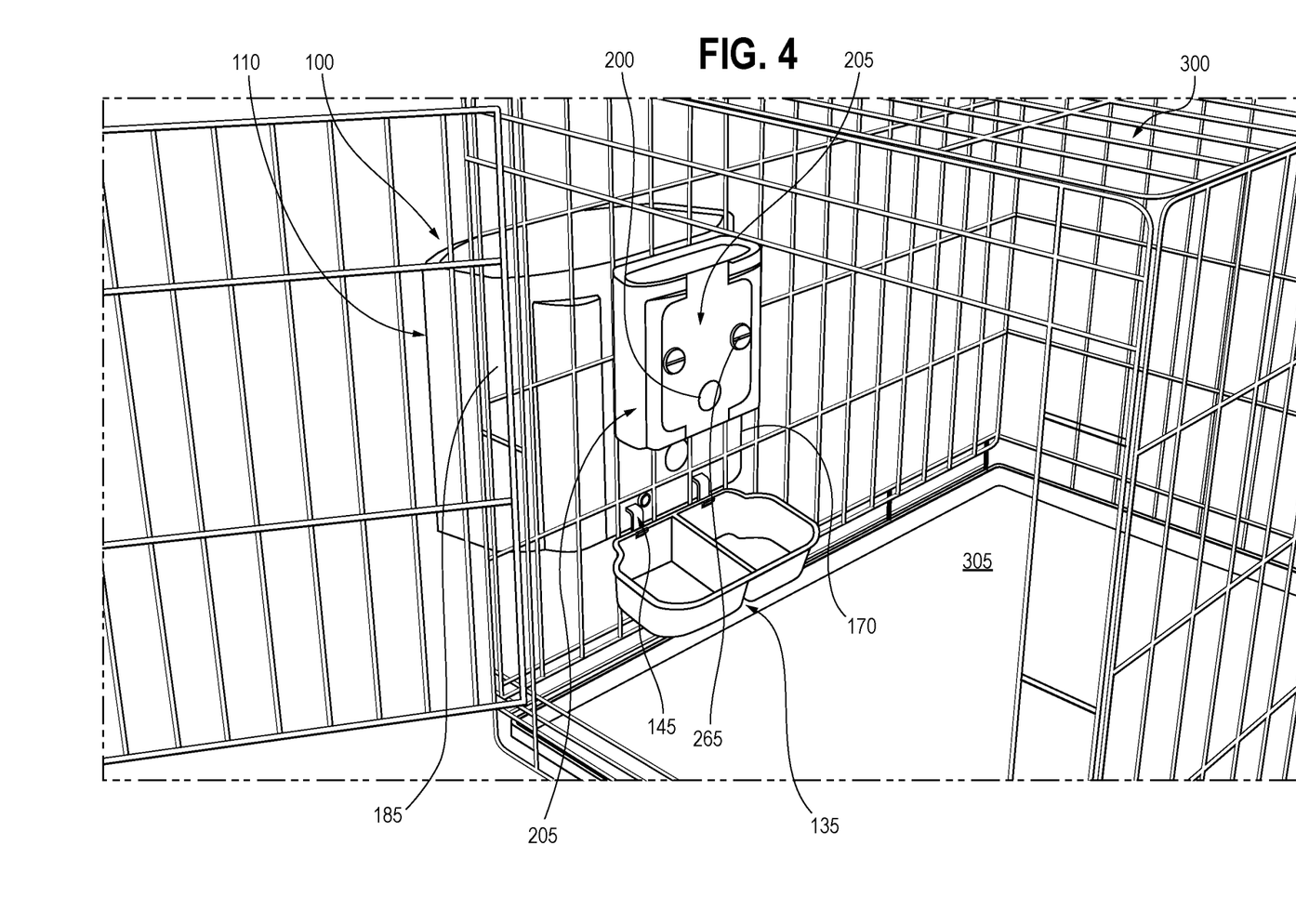
FIG. 4 is an isometric view of a modular apparatus attached to a representative enclosure.
Figure 5:
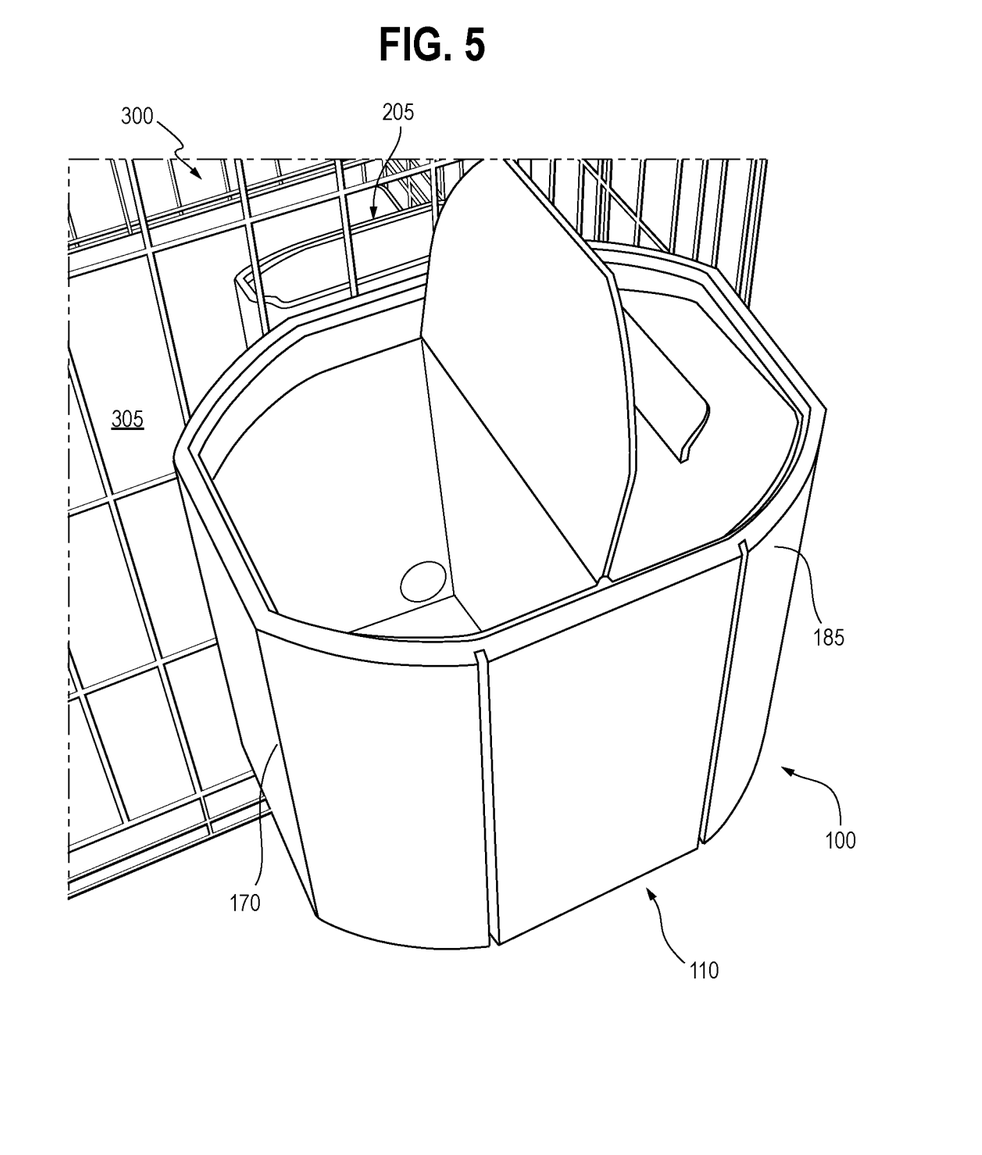
FIG. 5 is a rear isometric view of the modular apparatus of FIG. 4.

Advantageously, because the attachment apparatus 205 may be selectively coupled to the body 110, the attachment apparatus 205 may be used to attach the modular apparatus 100 to various enclosures (including, but not limited to, crates and kennels), as illustrated in FIGS. 4 and 5. The enclosures, such as the representative enclosure 300, may be used to house the domestic animal when the user is away from home, when the user is transporting the domestic animal, or as desired by the domestic animal. As previously described, the modular apparatus 100 may provide the domestic animal sustenance and engagement when the domestic animal is within the representative enclosure 300.

As illustrated in FIG. 4, modular apparatus 100 may be coupled to the representative enclosure 300 in a variety of manners via the attachment apparatus 205. As a non-limiting example, the attachment apparatus 205 may first be decoupled from the body 110 of the modular apparatus 100 by removing the fastening means 265 from the attachment apparatus 205. Then, the user may position the body 110 on the representative enclosure 300 as desired. Once the user is satisfied with the positioning of the body 110 on the representative enclosure 300, the user may the recouple the attachment apparatus 205 to the body 110 using the fastening means 265. If desired, the user may adjust the tightness of the fastening means 265 to adjust how tightly the modular apparatus 100 is coupled to the representative enclosure 300.

Preferably, when the modular apparatus 100 is coupled to an enclosure such as the representative enclosure 300, the tray 135 is positioned and located within an interior volume 305 of the representative enclosure 300. Thus, when the dispenser system 155 provides sustenance that is received into the tray 135, the domestic animal may retrieve the sustenance while inside the representative enclosure 300. In the illustrated embodiment, the attachment means 145 protrude into the volume of the representative enclosure 300 such that the tray 135 can be affixed to the modular apparatus 100, although in other embodiments the tray 135 may extend outside the interior volume 305 such that the tray 135 may couple to the modular apparatus 100.

Conversely, the body 110, and specifically the food container 170 and the water reservoir 185, may be positioned and located outside the interior volume 305 when the modular apparatus 100 is attached to the representative enclosure 300. Positioning the body 110 in this manner may allow the user to more conveniently refill the food container 170 and/or the water reservoir 185 when the modular apparatus 100 is coupled to the representative enclosure 300 and/or when the pet is within the representative enclosure 300.

In some embodiments, a means for selectively enclosing a domestic animal located inside of an enclosure may comprise a lock, wherein the lock is automated or mechanically enabled for remote use. In one embodiment, when the modular apparatus 100 is located near an exit or opening of a building or a residence, the lock can permit the animal to leave the representative enclosure 300 for a variety of reasons, including, without limitation, to eliminate waste, and the like. In another embodiment, the modular apparatus 100 can be located or placed on an animal enclosure in the proximity of a gate or point of exit or egress of the enclosure, such that the lock can be arranged to selectively restrict or permit the gate or point of exit or egress of the enclosure to open. In one embodiment, the lock can be programmed to selectively operate (e.g., allowing an animal to either enter or leave the animal enclosure apparatus or an enclosure) at various times or under various conditions. For example, the lock can be programmed to selectively enclose the domestic animal when it is detected that the domestic animal is inside an enclosure. Alternatively, the lock can be programmed to permit the animal to leave the enclosure at certain times of the day based on the animal's food consumption, water consumption, physical activity, and the like. In another embodiment, the lock can be adapted to permit for the selective enclosure of the domestic animal, either by a user or by the domestic animal. For example, a user could remotely and selectively actuate the mechanical feature of the lock to either enclose the domestic animal or permit the animal to leave an enclosure. Additionally, or alternatively, the domestic animal can trigger a sensor that actuates the mechanical feature of the lock to either enclose the domestic animal or permit the animal to leave an enclosure. Further, the lock can be capable of rendering an output signal or deliverable data capable of being used or processed by a user, such as a notification that the lock is securely engaged or that the animal is triggering a sensor to actuate the mechanical feature of the lock for purposes of either enclosing the domestic animal or permitting the animal to leave an enclosure.

Figure 6:
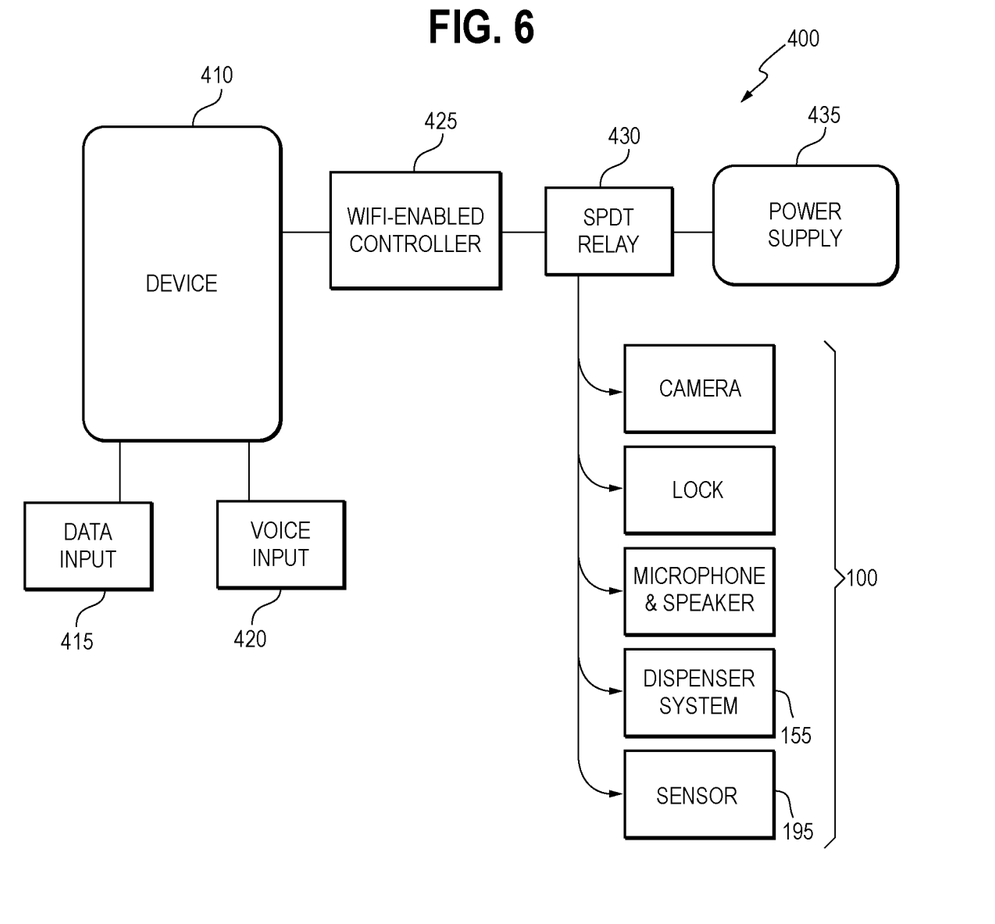
FIG. 6 is a schematic representation of a system for a modular apparatus according to the teachings of an embodiment of the present invention.

As shown in FIG. 6, a preferred embodiment of the present invention may include a system 400 that generally comprises a device 410, such as a cell phone, tablet, or the like, that is operably in communication with various features of the modular apparatus 100.

One embodiment of the present invention is designed to provide the system 400 for enclosing an animal that generally comprises the modular apparatus 100 and the device 410, wherein the modular apparatus 100 generally comprises the representative enclosure 300 and a variety of features, where such features are generally controllable by a user remotely or from a location other than the location of the modular apparatus 100. The device 410 may be adapted for receiving a variety of inputs, including, without limitation, a data input 415 and a voice input 420. In a preferred embodiment, the device 410 may be in communication with the variety of features through a Wi-Fi-enabled controller 425. The device 410 may be in communication with other elements of the system 400 by various means, including, without limitation, via the internet through a wireless local area connection or via short-wavelength ultra high frequency radio waves between 2.400 and 2.485 GHz, and building personal area networks, such as through Bluetooth technology.

In another embodiment of the present invention, the system 400 can comprise the modular apparatus 100 that can be selectively attachable to an enclosure, wherein the modular apparatus 100 generally comprises a variety of features, wherein such features are generally controllable by a user remotely or from a location other than the location of the modular apparatus 100. The modular apparatus 100 may be adapted for receiving a variety of inputs, including, without limitation, the data input 415 and the voice input 420. In a preferred embodiment, the modular apparatus 100 may be in communication with the variety of features through the Wi-Fi-enabled controller 425. The modular apparatus 100 may be in communication with other elements of the system 400 by various means, including, without limitation, via the internet through a wireless local area connection or via short-wavelength ultra high frequency radio waves between 2.400 and 2.485 GHz, and building personal area networks, such as through Bluetooth technology.

The system 400 may further comprise a downloadable application or series of applications for remotely using or otherwise utilizing the variety of features of the system 400, including, without limitation, the sensor 200, the dispenser system 155, the lock, the combination microphone and speaker, and the camera. The downloadable application or series of applications comprises functionalities corresponding with the variety of features of the system 400. Further, the downloadable application or series of applications being usable on a Wi-Fi-enabled or Bluetooth-enabled cell phone, tablet, or the like. Further, the downloadable application or series of applications can permit the use of voice-command features and the like.

In one embodiment, as shown in FIG. 6, the variety of features may be interconnected via a common communication with an intermediate device (not shown). Such intermediate device may comprise a processor, a memory, an output module, and/or an input module, wherein the processor can be configured to be instructed or directed by a user via the input module and/or the memory, or in some similar manner. Such processor can generally comprise one or more processing units configured to carry out instructions either hardwired as part of an application-specific integrated circuit or provided as code or software stored in the memory. Further, the processor can generate deliverable data or signals following instructions provided by the memory or a module contained therein. Such deliverable data or signals can comprise various types of information or notifications. Further yet, the memory can comprise a non-transient computer-readable medium or persistent storage device for storing data or other information for use by the processor or generated by the processor. The memory can further store instructions in the form of code or software for the processor. The intermediate device may comprise a Single Port Double Throw ("SPDT") relay 430. It will be understood that one or more of such components, including any sub-element of the processor and/or the memory, may alternatively be located remotely from the system 400 and in communication with the system 400 in a wireless fashion, such that the user can remotely use or otherwise utilize the variety of features of the system 400.

As shown in FIG. 6, system 400 may also comprise a power supply 435 for energizing any component or set of components of the system 400, including, without limitation, the modular apparatus 100, the Wi-Fi-enabled controller 425, the SPDT relay 430, and the like. In one embodiment, the power supply 435 can comprise a battery.

In one embodiment, each component of the apparatus or system (excluding the battery) can be connected to a computer or series of computers, including, without limitation, a Raspberry Pi. In such embodiment, each component can connect with and function together through the computer or series of computers, which may be controlled through certain software code. The computer or series of computers can connect to Wi-Fi, which would allow the computer or series of computers to connect to the interne, send data to the cloud, and process certain software code.

In another embodiment, any apparatus or system of the present invention can be controlled through a mobile application, web application, or by voice command. The user could open the application, connect his or her device to the apparatus or system through Wi-Fi, and select which component within the apparatus or system they wish to control and operate. Upon connecting to the Wi-Fi, the user can be connected to the certain software and/or hardware that would give them access to the various components of the device.

From the accompanying materials, it will be seen that the invention is one well adapted to attain all the ends and objects set forth herein with other advantages which are obvious and which are inherent to the structure. It will be understood that certain features and subcombinations are of utility and may be employed without reference to other features and subcombinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described in the accompanying materials and illustrated in the drawings are presented by way of example only and are not intended to limit the concepts and principles of the present invention. Thus, there has been shown and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for caring for a pet, the apparatus comprising:
   a first body selectively couplable to an at least one external member, the first body further including a dispenser system adapted to provide sustenance to the pet through at least one aperture;
   a container selectively couplable to the first body, wherein, when the container is coupled to the first body, the container is positioned and located below the at least one aperture to receive the sustenance from the dispenser system;
   a lid coupled to a top portion of the first body, the lid comprising a first section and a second section that are independently actuatable;
   a first sensor disposed in a second body positioned and located above the at least one aperture, the first sensor adapted to detect if the pet is proximate to the apparatus, wherein the first sensor is configured to activate the dispenser system when the first sensor detects the pet is proximate to the apparatus;
   a second sensor designed to detect visual information;

a third sensor designed to detect sound;
an attachment apparatus designed to selectively couple the first body to the second body, the attachment apparatus configured to position the first body and the second body on opposite sides of the at least one external member;
an at least one feature; and
a control system further including:
  a Wi-Fi enabled controller in communication with the first sensor, the second sensor, and the third sensor, the Wi-Fi enabled controller designed to provide deliverable data based on information collected by the first sensor, the second sensor, and the third sensor;
  a device configured to receive inputs including the deliverable data;
  an application downloadable on the device for enabling a user to remotely operate the apparatus; and
  a power supply,
wherein the at least one feature is remotely controllable by a user.

2. The apparatus of claim 1, wherein the at least one external member is a stand or an enclosure.

3. The apparatus of claim 1, wherein the at least one external member is provided as an enclosure and, when the apparatus is coupled to the enclosure, the container and the second body are positioned within an internal volume of the enclosure.

4. The apparatus of claim 1, wherein the first body further includes a food container and a water tank and, when the apparatus is coupled to the at least one external member, the first body is positioned and located outside an internal volume of the at least one external member.

5. The apparatus of claim 4, further comprising
a fourth sensor designed to monitor the amount of sustenance provided to the pet,
wherein the Wi-Fi enabled controller determines the deliverable data based on one or more inputs from at least one of the first sensor, the second sensor, the third sensor, and the fourth sensor, and
wherein:
  the at least one feature is selected from the group consisting of a camera, a speaker, a two-way audio speaker, a microphone, a servo motor, a lock, and combinations thereof,
  the deliverable data comprises a notification provided to the device, and
  the notification is designed to notify a user when the food container or the water container are substantially empty.

6. The apparatus of claim 1, wherein the at least one feature comprises:
a first output adapted to play music or sounds that are perceivable by the pet;
a treat dispenser;
a food dispenser; and
a water dispenser,
wherein the first sensor is provided in the form of an ultrasonic sensor,
wherein the second sensor is provided in the form of a camera including a speaker.

7. A system for caring for a pet, the system comprising:
an apparatus further including:
  an at least one feature;
  a first sensor designed to detect sound;
  a second sensor;
  a first body comprising a base, a sidewall extending upwardly from the base and having an upper portion and a lower portion, a food container, and a water tank, wherein a first aperture extends through the lower portion of the sidewall and is in communication with the food container and a second aperture extends through the lower portion of the sidewall and is in fluid communication with the water tank;
  a lid coupled to the first body and positioned above the food container and the water tank, the lid comprising:
    a first portion positioned above the food container and including a first handle,
    a second portion positioned above the water container and including a second handle, and
    a rotatable attachment mechanism coupled to and positioned between the first portion and the second portion,
    wherein the rotatable attachment mechanism is configured to allow the first portion of the lid to rotate towards and away from the second portion,
    wherein the rotatable attachment mechanism is configured to allow the second portion of the lid to rotate towards and away from the first portion of the lid;
  a second body selectively couplable to the upper portion of the sidewall of the first body, wherein the at least one feature is at least partially disposed within the second body;
  a container including a first compartment configured to receive food from the food container and a second compartment configured to receive water from the water tank;
  a device in communication with the at least one feature; and
  a control system further including a device and a controller, wherein the controller provides communication between the device and one or both of the first sensor and the second sensor, the controller designed to provide deliverable data to a user based on information collected by the first sensor and the second sensor,
  wherein the apparatus is configured to couple with an enclosure when the first body is positioned on a first side of the enclosure and the second body is positioned on a second side of the enclosure, the second side of the enclosure located opposite the first side of the enclosure.

8. The system of claim 7, wherein the control system determines additional deliverable data related to at least one of a rate of water consumption of the pet and a rate of food consumption of the pet, wherein the at least one feature permits the user to monitor the pet, and wherein the additional deliverable data is provided to a veterinarian or other pet healthcare professional.

9. The system of claim 7, wherein the first body and the second body are selectively couplable via a fastening means.

10. The system of claim 7, wherein the at least one feature is positioned and located on the second body, and wherein the at least one feature comprises at least one of the following: a sensor, a camera, a microphone, and a speaker.

11. The system of claim 7 further including at least one J-hook and a bowl provided in the form of:
a first compartment including a first aperture extending through a first sidewall, the first aperture designed to receive the at least one J-hook; and a second compartment including a second aperture extending through a second sidewall, the second aperture designed to receive the at least one J-hook, wherein the bowl is selectively couplable to the system and, when the bowl is coupled to the system and the system is coupled to an enclosure, the bowl is positioned entirely within the enclosure.

12. The system of claim 7, wherein the at least one feature provides sustenance to the pet at predetermined times selected by the user.

13. The system of claim 7, wherein the device is in wireless communication with the at least one feature via at least one of the following: an internet, local area networks, short-wavelength ultra high frequency radio waves, and building personal area networks.

14. An apparatus comprising:
a body comprising a food container and a water reservoir;
a first attachment mechanism received in the body and extending outwardly and away from the body;
a second attachment mechanism received in the body and extending outwardly and away from the body;
a dispenser system in communication with the food container and the water reservoir;
a housing coupled to the body via a third attachment mechanism;
a container designed to receive sustenance from the food container and the water reservoir, the container provided in the form of:
  a first compartment coupled to the first attachment mechanism; and
  a second compartment integrally formed with the first compartment and coupled to the second attachment mechanism,
  wherein the container is positioned and located below the housing and the dispenser system;
a monitoring system designed to sense an amount of food or water dispensed by the dispenser system, wherein the monitoring system is positioned and located within the housing, the monitoring system further comprising:
  a first sensor designed to detect if a pet is proximate to the apparatus;
  a second sensor designed to detect visual information;
  a third sensor designed to detect sound;
  a Wi-Fi enabled controller in communication with the first, second, and third sensors, the Wi-Fi enabled controller designed to provide deliverable data based on information collected by the first, second, and third sensors;
  a device configured to receive inputs including the deliverable data;
  an application downloadable on a device for enabling a user to remotely operate the apparatus; and
  a power supply,
wherein, when the apparatus is coupled to an enclosure, the first attachment mechanism and the second attachment mechanism extend through the enclosure, and the first compartment and the second compartment of the container are positioned entirely within the enclosure,
wherein the third attachment mechanism is adapted to couple the apparatus to an enclosure.

15. The apparatus of claim 14, wherein the deliverable data is related to at least one of a rate of water consumption of the pet and a rate of food consumption of the pet.

16. The apparatus of claim 14, wherein when the apparatus is coupled to the enclosure, the dispenser system can provide sustenance to an animal within the enclosure.

17. The apparatus of claim 14, wherein the dispenser system is activated by at least one of the following: remotely by a user and by a proximity of an animal to the apparatus.

18. The apparatus of claim 14, wherein the apparatus further includes at least one sensor configured to be monitored by a user.

19. The apparatus of claim 14, wherein the apparatus is in wireless communication with a device, and the device can control an at least one feature of the apparatus.

20. The apparatus of claim 14, wherein the monitoring system further includes at least one sensor and the at least one sensor is adapted to monitor movement of a pet.

* * * * *